Aug. 12, 1969 R. H. McMANN, JR 3,461,224
GAMMA CORRECTION CIRCUIT FOR FIELD SEQUENTIAL COLOR TELEVISION
Filed April 22, 1966
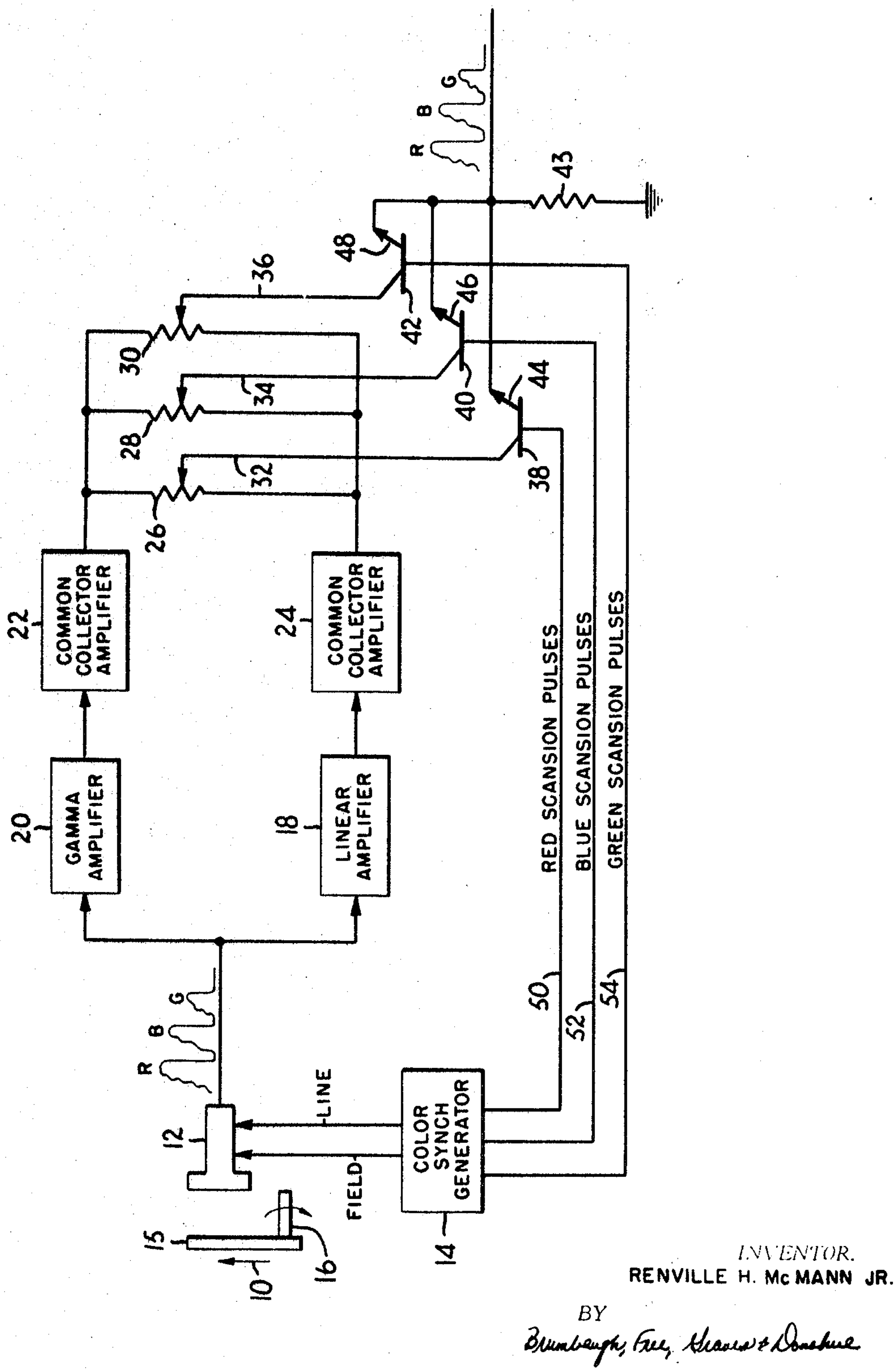
INVENTOR.
RENVILLE H. Mc MANN JR.
BY
Brumbaugh, Free, Graves & Donohue
his ATTORNEYS 3,461,224
Patented Aug. 12, 1969

3,461,224
GAMMA CORRECTION CIRCUIT FOR FIELD SEQUENTIAL COLOR TELEVISION

Renville H. McMann, Jr., Stamford, Conn., assignor to Columbia Broadcasting System, Inc., New York, N.Y., a corporation of New York Filed Apr. 22, 1966, Ser. No. 544,574
Int. Cl. H04n 5/38, 5/44
U.S. Cl. 178—5.4 5 Claims

ABSTRACT OF THE DISCLOSURE

As described herein, a gamma correction circuit for field sequential color television signals includes a linear amplifier and a gamma amplifier which produce, respectively, distortionless and exponential reproductions of the input color signals. The gamma corrected and linear reproductions of the color signals are then applied to a mixing amplifier wherein the signals are mixed appropriately to produce properly balanced color signals. Keying signals are thereafter utilized to transmit selectively the balanced color signals.

This invention relates to color television systems and, more particularly, to correction apparatus employed in color television systems of the field sequential type.

In the transmission and reproduction of television images in field sequential color television systems, circuits are employed to correct the successive portions of the derived video signal to compensate for information lost in the transmission of the video signal, the nonlinear transfer characteristic of the elements of the system, and the like. Moreover, since the system parameters vary with different devices employed in the system, the amount of correction must be variable to achieve high resolution and fidelity of the reproduced images.

For example, certain color television camera tubes have different gamma characteristics for the red, green, and blue signals. Consequently, a gamma amplifier must be provided which is capable of compensating for the different gammas of the various color signals. Also, the amount of gamma correction introduced by the gamma amplifier into the television system to achieve over-all system linearity must be variable over a range of approximately 0.5 to unity since it is dependent upon the type of scanning device employed, the brightness range of the object field and the type of reproducing device employed at the receiver. For normal studio use, the scanning device is ordinarily of the image orthicon type having a transfer characteristic of 0.65, the brightness is maintained within a 50 to 1 range and the receiver ordinarily includes a kinescope having a transfer characteristic of 2.2. Additional gamma correction of about 0.70, separately adjustable for each color, is therefore required to linearize the system. For outdoor use, the brightness range may exceed 100 to 1 and additional correction is required to reduce the video signal to a value within the handling capability of the kinescope.

It is an object of the invention, accordingly, to provide a new and improved correction apparatus which overcomes the above-mentioned difficulties of present color television systems.

It is another object of this invention to provide a new and improved correction apparatus facilitating accurate control of the over-all system gamma without permitting hue and saturation distortion resulting from different gammas for the various colors and in certain components.

These and other objects of the invention are accomplished by providing both a linear amplifier and an overcorrected gamma amplifier for all color components of the video signal, along with a selective mixing circuit adapted to provide selective combinations of the linear and overcorrected signals for each color component. In a particular embodiment, the gamma amplifier reproduces the portions of the input video signal as an exponential reproduction of those portions and the linear amplifier reproduces the portions of the input video signal as a linear reproduction of those portions. The overcorrected and linear portions of the video signal are then applied to a mixing amplifier wherein the two signals are mixed in the appropriate proportions for each color to produce a properly balanced signal, the color components being selectively transmitted in response to keying signals.

For a better understanding of the present invention, reference may be had to the accompanying drawing which is a schematic block diagram illustrating the arrangement of a representative embodiment of the present invention.

Referring now to the drawing, an object field 10 is scanned by a conventional camera 12, of the image orthicon type, at line and field frequencies controlled by a color synchronizing generator 14. In a specific apparatus which has been operated with success in the field, the field scansion frequency is a nominal 180 cycles per second and the line scansion frequency is a nominal 47,250 cycles per second in order to produce a 525 line double-interlaced scanning pattern. Between the camera 12 and the object field 10 there is interposed a color filter 15 which sequentially presents different color aspects of the object field to the camera 12. The color filter device is preferably a disc rotating about an axis 16, the disc having one or more sets of angularly spaced color filters so that, as the disc rotates, different color filters are interposed in the path of the light to the camera 12. In the specific arrangement shown, the camera is of the field sequential type and the color disc is rotated in synchronism with the field scansions so that the color changes from one field scansion to the next. The successive portions of the derived video signal indicated by the letters R, B and G represent the primary color components of the scanned object field 10, namely red, blue and green.

Coupled to the output of the camera 12 are a linear amplifier 18 and a gamma correction amplifier 20. The gamma amplifier 20 provides amplitude signals which are exponential reproductions of the input portions of the video signal, the gamma amplifier being chosen such that the gradient or slope of the amplifier's transfer function approximates 0.5. For example, the gamma amplifier 20 may have an output which is exponentially related to its input according to the 0.5 power. The rationale behind the selection of the transfer characteristic of the amplifier 20 lies in the fact that a lower correction exponent than needed to linearize the system is sometimes required to reduce the brightness range of the signal to a value within the handling capability of the kinescope. However, even where a scanning device exhibiting a gamma of unity is employed in the system, 0.5 represents the maximum amount of gamma correction that can be added into the system without seriously affecting the hue and saturation of the reproduced picture. Although several different conventional gamma amplifiers may be employed, one such circuit used with success in the present invention consists of a constant current source generator driving three non-linear germanium diodes in parallel, the signal voltage drop across the non-linear diodes being a function of the current flow through the diodes.

The linear amplifier 18 is also of a conventional type and provides an amplified signal which is a distortionless reproduction of the input video signal, the amplifier exhibiting a gamma of unity. It is significant to note that the red, blue and green components of the derived video signal are amplified by the same amplifiers, i.e., the gamma amplifier 20 and the linear amplifier 18. In systems which employ individual amplifiers for the three color components of the signal, hue errors varying with brightness often occur as the result of dissimilar transfer curves of the gamma amplifiers.

Thereupon, the gamma corrected and linear portions of the derived video signal are applied to a mixing amplifier which includes a pair of common collector amplifiers 22 and 24, connected to receive signals from the amplifiers 20 and 18, respectively, and having their output terminals tied together across three potentiometers 26, 28 and 30. The potentiometers 26, 28 and 30 include movable taps 32, 34 and 36, respectively, which are suitably placed to produce signals having the proportion of the overcorrected and linear signals required to provide the desired amount of signal correction. Although several types of amplifiers have been used with success in the instant invention, the common collector is preferred since the voltage gain is less than unity and varies as a function of the normally low output impedance.

The gamma corrected and linear portions of the video signal are amplified by the amplifiers 22 and 24, respectively, and applied to the opposite ends of the potentiometers 26, 28 and 30 wherein the desired transfer ratios, ranging from 0.5 to unity are obtained for each color component. Although mixing of the 0.5 power exponential signal with the linear occurs in the three potentiometers for each portion of the video signal, only one signal is derived from the potentiometers for each field scansion of the object field in a primary color, as will be explained in further detail below.

As mentioned above, the amount of gamma correction required for any color television system varies with the scanning device used and the brightness range of the object field 10. Thus, assuming a controlled brightness range, i.e., between twenty and fifty to one, a gamma correction of about 0.70, separately adjustable for each color, is required in order to linearize the over-all system transfer characteristic. The taps 26, 28 and 30 of the potentiometers would be set at about the middle of the resistances so as to tap off an equal amount of the 0.5 power exponential signal and the linear signal. Should the brightness range exceed fifty to one, therefore requiring some overcorrection or should the device 12 be of the flying spot scanner type wherein the gamma is unity, the taps would be set closer to the output terminal of the amplifier 22 so as to tap off a greater proportionate amount of the exponential signal.

As shown, the arms 32, 34 and 36 of the potentiometers are selectively coupled to a plurality of gates 38, 40 and 42, respectively, shown as common collector amplifiers. These amplifiers include transistors of the NPN type and a load resistor 43 tied across the emitters 44, 46 and 48 of the transistors. The gates are keyed are enabled on a field by field basis by field scansion pulses of proper phase and duration generated by the color synchronizing generator 14, as indicated by the lines 50, 52 and 54. The red, blue and green scansion pulses are applied sequentially to the gates and coincide with the camera scan of the corresponding color aspects of the object field 10 and in synchronism with the color wheel 15.

For each scan of the object field in a primary color, three signals representing the proper gamma correction for each portion of the derived video signal are applied simultaneously to the collectors of the transistors 38, 40 and 42. However, only the signal appearing at the collector of a conducting transistor is effective and serves to amplitude modulate an applied primary color scansion pulse. As shown, therefore, the effective mixing or gamma correction of the red component of the video signal occurs within the potentiometer 26, the correction of the blue component of the video signal occurs within the potentiometer 28, and the mixing of the blue component occurs within the potentiometer 30.

The application of the corrected portions of the video signal to the collectors of the transistors 38, 40 and 42, or as more commonly referred to "collector injection," is the preferred method of gating the corrected signals to the rest of the television system. Since the voltage gain of the amplifiers never exceeds unity and the gating field scansion signals are pulses, distortionless corrected signals are applied across the load resistor 43 to the remainder of the system.

It will be understood that the invention is susceptible of considerable modification and not limited to gamma correction of the derived video signals. For example, the portions of the video signal are often preemphasized prior to transmission to compensate for attenuation of the high frequency segments of the color portions. Again, since the amount of preemphasis required varies from system to system and from color to color, the proper amount of preemphasis can be assured by mixing a signal representing an overly preemphasized reproduction of the video signal with a linear signal in accordance with the principles of the present invention. Accordingly, all modifications and variations within the skill of the art are included within the spirit and intended scope of the invention as defined by the following claims.

I claim:

1. In apparatus for correcting a color video signal wherein successive portions represent field scansions of an object field in different primary colors, first amplifier means for deriving from said successive portions signals representing substantially linear reproductions of said portions, second amplifier means for deriving from said portions signals representing overcorrected reproductions of said portions, a plurality of mixing means for mixing said derived signals and means for selectively applying the outputs of said plural mixing means to an output means.

2. Apparatus as set forth in claim 1 wherein said mixing means includes a pair of amplifiers having corresponding output terminals coupled across a plurality of variable impedances, and selective gating means coupled to said variable impedances.

3. In a television system including image scanning means and an image reproducing means, the combination of first amplifier means for deriving from the successive portions of a derived video signal representing field scansions of an object field in different primary colors signals representing linear reproductions of said portions, second amplifier means for deriving from the successive portions of the video signal signals representing nonlinear reproductions of said portions, mixing means comprising a pair of further amplifiers receiving signals from the first and second amplifier means, respectively, and having output terminals coupled across a plurality of potentiometers for mixing said signals in said potentiometers, and gating means selectively coupled to the taps of said potentiometers and gated by pulses corresponding to field scansions in said different primary colors, for providing output signals having portions containing said mixed signals.

4. A system as set forth in claim 3 wherein said first amplifier means includes a gamma correction amplifier, said second amplifier means includes a linear amplifier, and said gating means includes common collector transistor means having their collector terminals coupled to the taps of said potentiometers.

5. A system as set forth in claim 3 wherein the second amplifier means provides an output which is an exponential function of its input.

References Cited

UNITED STATES PATENTS

| | | | |
|---|---|---|---|
| 2,692,333 | 10/1954 | Holmes | 178—7.1 X |
| 2,884,484 | 4/1959 | Deichert | 178—5.4 |
| 3,054,853 | 9/1962 | Sunstein | 178—5.4 |

FOREIGN PATENTS

| | | |
|---|---|---|
| 859,127 | 1/1961 | Great Britain. |

OTHER REFERENCES

Massachusetts Institute of Technology Radiation Laboratory Series, vol. 19, "Waveforms," McGraw-Hill, 1959, pp. 640–646.

RICHARD MURRAY, Primary Examiner

JOHN MARTIN, Assistant Examiner